US007948862B2

(12) United States Patent
Parnaby

(10) Patent No.: US 7,948,862 B2
(45) Date of Patent: May 24, 2011

(54) CROSSTALK CANCELLATION USING SLIDING FILTERS

(75) Inventor: Gavin D. Parnaby, Irvine, CA (US)

(73) Assignee: Solarflare Communications, Inc., Irvine, CA (US)

( * ) Notice: Subject to any disclaimer, the term of this patent is extended or adjusted under 35 U.S.C. 154(b) by 718 days.

(21) Appl. No.: 11/904,631

(22) Filed: Sep. 26, 2007

(65) Prior Publication Data

US 2009/0080325 A1 Mar. 26, 2009

(51) Int. Cl.
*H04J 1/12* (2006.01)
(52) U.S. Cl. ........ 370/201; 370/286; 370/268; 370/282; 375/229; 375/260; 375/285; 375/296
(58) Field of Classification Search .................. 370/201, 370/286, 268, 282; 375/229, 260, 285, 296
See application file for complete search history.

(56) References Cited

U.S. PATENT DOCUMENTS

| | | | |
|---|---|---|---|
| 4,359,778 A | 11/1982 | Lee | |
| 4,583,235 A | 4/1986 | Dömer et al. | |
| 4,956,838 A | 9/1990 | Gilloire et al. | |
| 5,222,084 A | 6/1993 | Takahashi | |
| 5,305,307 A | 4/1994 | Chu | |
| 5,307,405 A | 4/1994 | Sih | |
| 5,388,124 A | 2/1995 | Laroia | |
| 5,633,863 A | 5/1997 | Gysel et al. | |
| 5,646,958 A | 7/1997 | Tsujimoto | |
| 5,856,970 A | 1/1999 | Gee et al. | |
| 5,896,452 A | 4/1999 | Yip et al. | |
| 5,903,546 A | 5/1999 | Ikeda et al. | |
| 5,909,466 A | 6/1999 | Labat et al. | |
| 6,081,502 A | 6/2000 | Paneth et al. | |
| 6,088,827 A | 7/2000 | Rao | |

(Continued)

FOREIGN PATENT DOCUMENTS

EP 0250048 12/1987

(Continued)

OTHER PUBLICATIONS

Gi-Hong Im, et al., "Performance of a Hybrid Decision Feedback Equalizer Structure for CAP-Based DSL Systems", *IEEE Transactions on Signal Processing* vol. 49, No. 8, Aug. 2001, pp. 1768-1785.

(Continued)

*Primary Examiner* — Huy D Vu
*Assistant Examiner* — Kibrom T Hailu
(74) *Attorney, Agent, or Firm* — Weide & Miller, Ltd.

(57) ABSTRACT

A crosstalk cancellation system and method is disclosed for use in a multi-channel communication system. Crosstalk which couples between channels is cancelled through use of an in-line FFE filter and in-line delay. A cross-connect system associated with each channel includes a cross-connect delay and cross-connect filter. The cross-connect system generates a cancellation signal for each of the channels, which is routed into a junction. The junction subtracts the cancellation signal from the received signal, which has also been delayed and filtered, to remove unwanted cross-talk. During training, cancellation magnitude is monitored at various delay offsets to determine which offset and corresponding filter coefficients, for each delay, maximizes cancellation. The filters are set with filter coefficients that maximize cancellation. The cross-connect delay with the maximum offset is set to zero and its calculated offset amount is established as the in-line delay offset. The other cross-connect delay offsets are adjusted accordingly.

5 Claims, 11 Drawing Sheets

U.S. PATENT DOCUMENTS

| | | | |
|---|---|---|---|
| 6,147,979 | A | 11/2000 | Michel et al. |
| 6,160,790 | A | 12/2000 | Bremer |
| 6,167,082 | A | 12/2000 | Ling et al. |
| 6,201,831 | B1 | 3/2001 | Agazzi et al. |
| 6,212,225 | B1 | 4/2001 | Agazzi et al. |
| 6,226,332 | B1 | 5/2001 | Agazzi et al. |
| 6,236,645 | B1 | 5/2001 | Agazzi et al. |
| 6,249,544 | B1 | 6/2001 | Agazzi et al. |
| 6,252,904 | B1 | 6/2001 | Agazzi et al. |
| 6,253,345 | B1 | 6/2001 | Agazzi et al. |
| 6,259,729 | B1 | 7/2001 | Seki |
| 6,272,173 | B1 | 8/2001 | Hatamian |
| 6,285,653 | B1 | 9/2001 | Koeman et al. |
| 6,297,647 | B2 | 10/2001 | Kirk et al. |
| 6,304,598 | B1 | 10/2001 | Agazzi et al. |
| 6,351,531 | B1 | 2/2002 | Tahernezhaadi et al. |
| 6,356,555 | B1 | 3/2002 | Rakib et al. |
| 6,433,558 | B1 | 8/2002 | Sciacero et al. |
| 6,463,041 | B1 | 10/2002 | Agazzi |
| 6,480,532 | B1 | 11/2002 | Vareljian |
| 6,493,448 | B1 | 12/2002 | Mann et al. |
| 6,553,085 | B1 | 4/2003 | Trans |
| 6,584,160 | B1 | 6/2003 | Amrany et al. |
| 6,618,480 | B1 | 9/2003 | Polley et al. |
| 6,665,402 | B1 | 12/2003 | Yue et al. |
| 6,751,255 | B1 | 6/2004 | Reuven et al. |
| 6,792,038 | B2 | 9/2004 | Agazzi |
| 6,813,311 | B1 | 11/2004 | Pal et al. |
| 6,819,709 | B1 | 11/2004 | Agazzi et al. |
| 6,862,326 | B1 | 3/2005 | Eran et al. |
| 6,928,168 | B2 * | 8/2005 | Kirkeby ............................ 381/1 |
| 6,961,373 | B2 | 11/2005 | Jones |
| 7,110,449 | B2 | 9/2006 | Heo et al. |
| 2001/0036160 | A1 | 11/2001 | Curran et al. |
| 2002/0067824 | A1 | 6/2002 | Wang |
| 2002/0106016 | A1 | 8/2002 | Egelmeers et al. |
| 2002/0176492 | A1 | 11/2002 | Zangi et al. |
| 2002/0191552 | A1 | 12/2002 | Watkinson |
| 2003/0067888 | A1 | 4/2003 | Bina et al. |
| 2003/0223505 | A1 * | 12/2003 | Verbin et al. .................. 375/261 |
| 2004/0001427 | A1 | 1/2004 | Belotserkovsky et al. |
| 2004/0001540 | A1 | 1/2004 | Jones |
| 2004/0022311 | A1 | 2/2004 | Zerbe et al. |
| 2004/0125487 | A9 | 7/2004 | Sternad et al. |
| 2005/0157811 | A1 | 7/2005 | Bjerke et al. |
| 2007/0143811 | A1 * | 6/2007 | Powell .......................... 725/127 |
| 2007/0237270 | A1 | 10/2007 | Mezer et al. |
| 2008/0013742 | A1 * | 1/2008 | Chang .............................. 381/1 |

FOREIGN PATENT DOCUMENTS

| | | |
|---|---|---|
| JP | 2003-250193 | 9/2003 |
| JP | 2009-116472 | 5/2009 |
| KR | 10-2007-0018663 | 2/2007 |

OTHER PUBLICATIONS

Eyuboglu M V., "Flexible Precoding for V.Fast", Data Transmission—Advances in Modem and ISDN Technology and Applications, 1992., UK, IEE, UK 1992, pp. 13-18.

R.F.H. Fischer and J.B. Huber, "Comparison of precoding schemes for digital subscriber lines," *IEEE Transactions on Communications*, vol. 45, pp. 334-343, Mar. 1997.

M. Hatamian et al., "Design considerations for Gigabit Ethernet 1000BASE-T twisted pair transceivers," in *Proceeding IEEE Custom Integrated Circuits Conference*, Santa Clara, CA, May 1998, pp. 335-342.

E.F. Haratsch and K. Azadet, "A 1-Gb/s joint equalizer and trellis decoder for 1000BASE-T Gigabit Ethernet,"*IEEE Journal of Solid-State Circuits*, vol. 36, pp. 374-384, Mar. 2001.

Jaime E. Kardontchik, 4D Encoding in Level-One's Proposal for 1000Base-T, Aug. 21, 1997, pp. 1-24.

Gottfried Ungerboeck, Trellis-Coded Modulation with Redundant Signal Sets Part 1: Introduction, IEEE Communications Magazine, Feb. 1987, pp. 5-21.

Oscar Agazzi, Nambi Seshadri, Gottfried Ungerboeck, 10Gb/s PMD Using PAM-5 Trellis Coded Modulation, Mar. 6-10, 2000, pp. 1-38.

M. Tomlinson, "New Automatic Equalizer Employing Modulo Arithmetic," *Electronic Letters*, vol. 7, pp. 138-139, 1971.

H. Harashima and H. Miyakawa, "Matched-transmission technique for channels with intersymbol interference," *IEEE Transactions on Communications*, vol. COM-20, No. 4, pp. 774-780, Aug. 1972.

P. Kabal and S. Pasupathy, "Partial-response signaling," *IEEE Transactions on Communications*, vol. COM-23, No. 9, pp. 921-934, Sep. 1975.

R.F.H. Fischer, W.H. Gerstacker, and J.B. Huber, "Dynamics limited precoding, shaping, and blind equalization for fast digital transmission ever twisted pair lines,"*IEEE Journal on Selected Areas in Communications*, vol. 13, No. 9, pp. 1622-1633, Dec. 1995.

"Gigabit Ethernet Over Category 5", Copyright 2000-2001 Agilent Technologies, 12 pages.

M.P. Sellers, et al., "Stabilized Precoder for Indoor Radio Communications", *IEEE Communications Letters*, vol. 4, No. 10, Oct. 2000, pp. 315-317.

"Wirescope 350—Understanding ELFEXT", © 2000 Agilent Technologies, 2 pages.

David Crawford, "Adaptive Filters", © David Crawford 1996, pp. 1-5.

David A. Johns, et al., "Integrated Circuits for Data Transmission Over Twisted-pair Channels", IEEE Journal of Solid-State Circuits, vol. 32, No. 3, Mar. 1997, pp. 398-406.

Prof. David Johns, University of Toronto, "Equalization", © D.A. Johns 1997, 29 pages.

David Smalley, "Equalization Concepts: A Tutorial", Atlanta Regional Technology Center, Texas Instruments, pp. 1-29, Oct. 1994.

Richard D. Wesel, et al., "Achievable Rates for Tomlinson-Harashima Precoding", *IEEE Transactions on Information Theory*, vol. 44, No. 2, Mar. 1998, pp. 824-831.

Wolfgang H. Gerstacker, et al., "Blind Equalization Techniques for xDSL Using Channel Coding and Precoding", submitted to AEÜ Int. J. Electr. Commun., pp. 1-4, May 1999.

Chip Fleming, "A Tutorial on Convolutional Coding with Viterbi Decoding", © 1999-2002, Spectrum Applications, pp. 1-6.

ELFEXT—Introduction, Fluke Networks™, © 2000, pp. 1-2.

"Iowegian's dspGuru FIR FAQ Part 2: Properties", © 1999-2000 Iowegian International Corp., pp. 1-4.

"28.5 Protocol Implementation Conformance Statement (PICS) Proforma for Clause 28, Physical Layer Link Signaling for 10 Mb/s 100 Mb/s and 1000 Mb/s Auto-Negotiation on Twisted Pair", *IEEE Std. 802.3*, 1998 Edition, pp. 6-14 and 18-44.

Huiting Chen, et al. "Current Mirror Circuit with Accurate Mirror Gain for Low β Transistors", supported in part by Dallas Semiconductor Corp., 4 pages, (Date Unknown).

A. Hekersdorf, et al., "A Scalable SDH/SONET Framer Architecture for DATACOM and TELCO Applications", IBM Research, Zurich Research Laboratory, Switzerland, 8 pages (Date Unknown).

Christopher T. DiMinico of Cable Design Technologies (CDT) Corporation, Massachusetts and Paul Kish of NORDX/CDT, Montreal Canada, "Development of Equal Level Far-End Crosstalk (ELFEXT) and Return Loss Specifications for Gigabit Ethernet Operation on Category 5 Copper Cabling", 10 pages (Date unknown).

Pedro Silva, et al., "Precoder Circuit for Channels with Multipath Dispersion", Telecommunications Institute, Department of Electronics and Telecommunications Engineering, the University of Aveiro—University Campus, Portugal, 4 pages (Date Unknown).

"Tutorial: Adaptive Filter, Acoustic Echo Canceller, and its Low Power Implementation", © of Freehand Communications AB, 6 pages (Date Unknown).

J. Jezek, Institute of Information Theory and Automation, Prague, Czech Republic, et al., "New Algorithm for Spectral Factorization and its Practical Application", pp. 1-6 (Date Unknown).

"ADSL Tutorial", http://www.dslforum.org/aboutdsl/adsl_tutorial.html, pp. 1-3 (Date Unknown).

"Introduction to DSP", http://www.bores.com/courses/intro/filters/4_fir.htm, pp. 1-2 (Date Unknown).

"QAM_VR—QAM Demodulator with Variable Rate", DesignObjects™ by sci-worx, pp. 1-2 (Date Unknown).

Description of Algorithms (Part I), http://pwl.netcom.com/~chip.f/viterbi/algrthms.html. pp. 1-7 (Date Unknown).

"Fast Fourier Transform", http://cas.ensmp.fr/~chaplais/Wavetour_presentation/transformees/Fourier/FFTUS.html, pp. 1-2 (Date Unknown).

"Continuous Time Aperiodic Signals: The Fourier Transform", http://ccc.ucsd.edu/~cruz/ccc.101/notes/node32.html, pp. 1-2 (Date Unknown).

"Convolution", http://www.wam.umd.edu/~toh/spectrum/Convolution.html, pp. 1-2 (Date Unknown).

"Convolution by DFT", http://www.gresilog.com/english/excommen/doc/convtd.htm, pp. 1-3 (Date Unknown).

Shao-Po Wu, et al., "FIR Filter Design via Semidefinite Programming and Spectral Factorization", Information Systems laboratory, Stanford University, Stanford, CA, 6 pages.

IEEE Transactions on Circuits and Systems—II: "Analog and Digital Signal Processing", vol. 45, No. 2, Feb. 1998.

Wolfgang H. Gerstacker, et al., Maximum SNR Design-Feedback Equalization with FIR Filters: Filter Optimization and a Signal Processing Application, © 1996 IEEE pp. 1188-1192.

"Transformer Polarity", Copyright 2002 Kilowatt Classroom, 11C, 1 page (Date Unknown).

"Application Note—Design of H.F. Wideband Power Transformers; Part II—EC07213", Philips Semiconductors, pp. 1-10, Mar. 23, 1998.

"Dot Convention to Denote the Polarity of a Transformer," Electric Machinery: Chap. 2 Transformers, Sep. 8, 1995, 3 pages.

Shao-Po Wu, et al., "FIR Filter Design via Spectral Factorization and Convex Optimization", Biswa Datta Editor, 1997, pp. 1-33.

Definition of Minimum Phase; www-ccrma.stanford.edu/~jos/filters/Definition_Minimum_Phase.html.

Producing a Counter EMF, 3 pages, Sep. 16, 2002.

FIR filter optimization as pre-emphasis of high-speed backplane data transmission; Li, M.; Wang, S., Tao, T., Kawasniewski, T; Electronics Letters; 8$^{th}$, Jul. 2004; vol. 40, No. 14.

M. Hatamian et al., βDesign considerations for Gigabit Ethernet 1000BASE-T twisted pair transceivers, in *Proceedings IEEE Custom Integrated Circuits Conference*, Santa Clara, CA, May 1998, pp. 335-342.

E.F. Haratsch and K. Azadet, βA 1-Gb/s joint equalizer and trellis decoder for 1000BASE-T Gigabit Ethernet, *IEEE Journal of Solid-State Circuits*, vol. 36, pp. 374-384, Mar. 2001.

Jaime E. Kardontchik, 4D Encoding in Level-Oneżs Proposal for 1000Base-T, Aug. 21, 1997, pp. 1-24.

Oscar Agazzi, Nambi Seshadri, Gottfried Ungerboeck, 10Gb/s PMD Using PAM-5 Trellis Coded Modulation, Mar. 6-10, 2000, pp. 1-38.

M. Tomlinson, βNew Automatic Equalizer Employing Modulo Arithmetic, *Electronic Letters*, vol. 7, pp. 138-139, 1971.

H. Harashima and H. Miyakawa, βMatched-transmission technique for channels with intersymbol interference, *IEEE Transactions on Communications*, vol. COM-20, No. 4, pp. 774-780, Aug. 1972.

P. Kabal and S. Pasupathy, βPartial-response signaling, *IEEE Transactions on Communications*, vol. COM-23, No. 9, pp. 921-934, Sep. 1975.

R.F.H. Fischer, W.H. Gerstacker, and J.B. Huber, βDynamics limited precoding, shaping, and blind equalization for fast digital transmission over twisted pair lines, β*IEEE Journal on Selected Areas in Communications*, vol. 13, No. 9, pp. 1622-1633, Dec. 1995.

βGigabit Ethernet Over Category 5, Copyright 2000-2001 Agilent Technologies, 12 pages.

M.P. Sellers, et al., βStabilized Precoder for Indoor Radio Communications, *IEEE Communications Letters*, vol. 4, No. 10, Oct. 2000, pp. 315-317.

βWirescope 350—Understanding ELFEXT, © 2000 Agilent Technologies, 2 pages.

David Crawford, βAdaptive Filters, © David Crawford 1996, pp. 1-5.

David A. Johns, et al., βIntegrated Circuits for Data Transmission Over Twisted-pair Channels□, IEEE Journal of Solid-State Circuits, vol. 32, No. 3, Mar. 1997, pp. 398-406.

Prof. David Johns, University of Toronto, βEqualization, © D.A. Johns 1997, 29 pages.

David Smalley, βEqualization Concepts: A Tutorial, Atlanta Regional Technology Center, Texas Instruments, pp. 1-29, Oct. 1994.

Richard D. Wesel, et al., βAchievable Rates for Tomlinson-Harashima Precoding, *IEEE Transactions on Information Theory*, vol. 44, No. 2, Mar. 1998, pp. 824-831.

Wolfgang H. Gerstacker, et al., βBlind Equalization Techniques for xDSL Using Channel Coding and Precoding, submitted to AEÜ Int. J. Electr. Commun., pp. 1-4, May 1999.

Chip Fleming, βA Tutorial on Convolutional Coding with Viterbi Decoding, © 1999-2002, Spectrum Applications, pp. 1-6.

Elfext—Introduction, Fluke Networks™, © 2000, pp. 1-2.

βIowegianżs dspGuru FIR FAQ Part 2: Properties, © 1999-2000 Iowegian International Corp., pp. 1-4.

β28.5 Protocol Implementation Conformance Statement (PICS) Proforma for Clause 28, Physical Layer Link Signaling for 10 Mb/s, 100 Mb/s and 1000 Mb/s Auto-Negotiation on Twisted Pair, *IEEE Std. 802.3*, 1998 Edition, pp. 6-14 and 18-44.

βTechnical Information—Use of Ferrites in Broadband Transformers, Fair-Rite Products, Corp., 14th Edition, pp. 170-173, 2008.

Huiting Chen, et al., βCurrent Minor Circuit with Accurate Minor Gain for Low β Transistors, supported in part by Dallas Semiconductor Corp., 4 pages, 2001.

A. Herkersdorf, et al., βA Scalable SDH/SONET Framer Architecture for DATACOM and TELCO Applications, IBM Research, Zurich Research Laboratory, Switzerland, 8 pages, issue date: 2000, meeting date: Feb. 15-17, 2000.

Christopher T. DiMinico of Cable Design Technologies (CDT) Corporation, Massachusetts and Paul Kish of NORDX/CDT, Montreal, Canada, βDevelopment of Equal Level Far-End Crosstalk (ELFEXT) and Return Loss Specifications for Gigabit Ethernet Operation on Category 5 Copper Cabling, 10 pages, Feb. 2003.

Pedro Silva, et al., βPrecoder Circuit for Channels with Multipath Dispersion, Telecommunications Institute, Department of Electronics and Telecommunications Engineering, The University of Aveiro—University Campus, Portugal, 4 pages, 2000.

βTutorial: Adaptive Filter, Acoustic Echo Canceller and its Low Power Implementation, © of Freehand Communication AB, 6 pages, 2006.

J. Ježk, Institute of Information Theory and Automation, Prague, Czec Republic, et al., βNew Algorithm for Spectral Factorization and its Practical Application, pp. 1-6, 2001.

βADSL Tutorial, http://www.dslforum.org/aboutdsl/ads_1_tutorial.html, pp. 1-3, Mar. 5, 2002.

βIntroduction to DSP, http://www.bores.com/courses/intro/filters/4_fir.htm, pp. 1-2, Mar. 4, 2002.

βQAM_VR-QAM Demodulator with Variable Rate, DesignObjects by sci-worx, pp. 1-2, revised Jan. 2004.

βDescription of Algorithms (Part 1), http://pw1.netcom.com/́chip.f/viterbi/algrthms.html, pp. 1-7, Mar. 5, 2002.

βFast Fourier Transform, http://cas.ensmp.fr/□chaplais/Wavetour_presentation/transformees/Fourier/FFTUS.html, pp. 1-2, Jul. 5, 2002.

βContinuous Time Aperiodic Signals: The Fourier Transform, http://ece.ucsd.edu/́cruz/ece.101/notes/nodes32.html, pp. 1-2, Jul. 5, 2002.

βConvolution, http://www.wam.umd.edu/́toh/spectrum/Convolution.html, pp. 1-2, Jul. 5, 2002.

*Convolution by DFT*, http://www.gresilog.com/english/excommend/doc/convtd.htm, pp. 1-3, Jul. 5, 2002.

Shao-Po Wu, et al., βFIR Filter Design via Semidefinite Programming and Spectral Factorization, Information Systems Laboratory, Stanford University, CA, 6 pages, issue date: Dec. 11-13, 1996.

IEEE Transactions on Circuits and Systems—II: βAnalog and Digital Signal Processing, vol. 45, No. 2, Feb. 1998.

Wolfgang H. Gerstacker, et al., βMaximum SNR Design-Feedback Equalization with FIR Filters: Filter Optimization and a Signal Processing Application, © 1996 IEEE pp. 1188-1192.

βTransformer Polarity, Copyright 2002 Kilowatt Classroom, 11C, 4 page, 2002.

βApplication Note—Design of H.F. Wideband Power Transformers; Part II—EC07213, Philips Semiconductors, pp. 1-10, Mar. 23, 1998.

βDot Convention to Denote the Polarity of a Transformer, Electric Machinery: Chap. 2 Transformers, Sep. 8, 1995, 3 pages.

Shao-Po Wu, et al., βFIR Filter Design via Spectral Factorization and Convex Optimization, Biswa Datta Editor, 1997, pp. 1-33.

* cited by examiner

CROSSTALK CANCELLATION USING SLIDING FILTERS

FIELD OF THE INVENTION

The invention relates to communication systems and in particular to a method and apparatus for cross talk cancellation.

RELATED ART

Modern communication systems achieve data communication between transceivers located at remote locations. To increase data communication rates, communication system cabling arrangements often include numerous conductors in close proximity to transport a signal between remote locations. These systems may be referred to as multi-channel communication systems. Furthermore, communication devices are often constructed on circuit boards containing numerous conductors, traces, or electrical devices. In all of these instances, coupling between channels of a multi-channel communication system may occur, thereby introducing interference into the other channels. This type of interference is generally referred to as crosstalk.

As is commonly understood, crosstalk may be characterized as near end crosstalk (NEXT) and far end crosstalk (FEXT), depending on the source of the crosstalk that is introduced and the recipient or victim of the crosstalk. FIG. 1 illustrates an example transceiver system with FEXT coupling. As shown a first set of transceivers 104A-104D is part of Station A 102, which is located at a first location. Station A 102 communicates over channels 108A-108D with a second set of transceivers 112A-112D that are part of Station B 110 and which are located at a second location. FEXT type crosstalk is shown in FIG. 1 by the coupling, 116AB, 116AC, 116AD, from lines 108B, 108C, 108D into the signal on channel 108A. In this arrangement, channel 108A is the victim channel. Thus, signals on each of the adjacent channels, i.e., the disturber signals on the disturber channels, often couple into the victim channel 108A and thereby interfere with reception of the desired signal being transmitted on the victim channel. For example, the signal on channel 108A will also include coupling from the signals transmitted onto Channels 108B-108D.

Similarly, the signal transmitted over the victim channel 108A may couple onto the other channels 108B-108D. These coupling signals are shown in FIG. 1 as coupling signals 120BA, 120CA, and 120DA. Hence, the processing and decoding of the received signals transmitted over channels 108A-108D is made more difficult by the coupling that occurs between channels.

While attempts have been made to overcome the effects of coupling, none of these attempts adequately reduces the presence or effects of crosstalk. One such attempt is detailed in U.S. Pat. No. 6,236,645 issued to Agazzi. The Agazzi reference teaches a cancellation system associated with each receiver in a multi-receiver system. The cancellation system disclosed in the Agazzi reference may be characterized as utilizing tentative decisions to reduce the effects of coupling onto a signal by making assumptions about the signal, such as a symbol value, that was sent on another channel. The tentative decision may be described as a guess regarding a symbol value that was sent on the channel.

The Agazzi reference does not, however, eliminate sufficient coupling to overcome all the drawbacks of the prior art, and hence, even when adopting the teachings of the Agazzi reference, coupling continues to interfere with isolation of the received signal. One particular drawback to the teachings of the Agazzi reference is that the system of the Agazzi reference continues to suffer from decision device error resulting from crosstalk corruption of a signal because it makes tentative decisions based on the analysis of a signal that includes an unacceptable amount of noise or coupling. This is particularly troublesome with systems that implement forward error correction (FEC) because with forward error correction, a high rate of errors can be expected. These errors are corrected by the FEC, but as a result of the high error rate, a slicer output is often invalid, and as such, may not be utilized in feedback arrangement.

Further, the filter proposed for use by the Agazzi reference is undesirably complex, since it must span the convolution of the channel response with the coupling response. This undesirably limits processing speeds.

Furthermore, prior art solutions often do not address many aspects of coupling signal cancellation. Such aspects include coupling that occurs and is out of phase or delayed in relation to the victim signal.

The method and apparatus disclosed herein overcomes the drawbacks of the prior art and enables more accurate signal decoding and processing than previously possible. Moreover, transmission at higher data rates with lower error rates, as compared to the prior art, is also enabled.

SUMMARY

To overcome the drawbacks of the prior art and to provide additional benefits, a crosstalk cancellation system is disclosed. This system may be configured for use in a multi-channel communication system. In one example embodiment, the system comprises a feedforward filter configured to receive a victim signal and process the victim signal to create a filtered victim signal. A delay is provided and configured to introduce a time offset to the filtered victim signal to create a delayed filtered victim signal. A multipath cross-connect system is also part of this embodiment and is configured to receive the delayed first filtered signal and generate a cancellation signal for at least one other channel in the multi-channel.

The cross-connect system comprises a filter configured to process the delayed filtered victim signal to create a cancellation signal and a delay configured to introduce a time offset into the delayed filtered victim signal or the cancellation signal. An output is configured to provide a time offset cancellation signal to at least one junction associated with another channel and a junction is configured to receive and combine at least one time offset cancellation signal from another channel with the delayed first filtered signal to reduce crosstalk in the received signal In one embodiment, the delays comprise variable delays. It is also contemplated that at least one of the paths in the multipath cross-connect system contains a delay which is set to zero time offset. In one embodiment, the junction comprises a summing junction configured to subtract at least one time offset cancellation signal from the delayed first filtered signal.

The system of claim 1, wherein the multi-channel communication system comprises a 4 channel Ethernet environment and each channel comprises a twisted pair of wires.

Also disclosed herein is a method for canceling crosstalk in a multichannel communication system comprising receiving a first signal on a first channel and a second signal on a second channel and then filtering the first signal to create a first filtered signal and filtering the second signal to create second filtered signal. This method then delays the first filtered signal to create a first delayed signal and delays the second filtered signal to create a second delayed signal. The method also filters the first delayed signal to create a first cancellation signal and filters the second delayed signal to create a second cancellation signal. Accordingly, combining the first cancellation signal with the second delayed signal occurs to cancel crosstalk in the second delayed signal and combining the second cancellation signal with the first delayed signal occurs to cancel crosstalk in the first delayed signal.

In one variation, the first signal is filtered with a FFE filter and the second signal is filtered with a second FFE signal. Using this method, the step of combining may be performed by one or more junctions configured to subtract a cancellation signal from a delayed signal. In addition, the multichannel communication system may comprise four channels and each channel may receive a cancellation signal from each of the other channels. In one embodiment the step of delaying the first filtered signal and delaying the first delayed signal or the first cancellation signal time aligns the first cancellation signal with the second delayed signal.

Also disclosed is a system for crosstalk cancellation in a multichannel communication system such that the system for crosstalk cancellation maximizes the crosstalk cancellation associated with each channel. In this embodiment, the system comprises one or more in-line filters configured to filter a received signal to create a filtered in-line signal and one or more delays configured to time delay the filtered signal to create a delayed in-line signal. This embodiment also comprises one or more cross-connect systems comprising one or more filters, one or more outputs configured to carry a cancellation signal to a junction associated with another channel, such that the cross-connect system is configured to process the delayed in-line signal and generate a cancellation signal. In this embodiment, one or more junctions are configured receive one or more cancellation signals from one or more other channels.

In one embodiment, the cross-connect system further comprises one or more cross-connect delays. The in-line filters may comprise a FFE type filter. In one embodiment, at least one of the one or more cross-connect delays is set to zero delay. In addition, the in-line delay may be configured to have at least as much delay as required for the cancellation of any one of the one or more cross-connect delays to be maximized.

Also disclosed herein is a method for training a crosstalk cancellation system, for each channel. In one embodiment, the method comprises providing a crosstalk cancellation system comprising one or more in-line filters, one or more in-line delays, one or more cross-connect filters, one or more cross-connect delays and a memory. Using this system, setting one or more in-line delays and one or more cross-connect delays to zero delay and training the one or more in-line filters. Also training the one or more cross-connect filters to generate cross-connect filter coefficients and then store the cross-connect filter coefficients. Then retraining the one or more in-line filters and storing of the resulting in-line filter coefficients with the cross-connect filter coefficient as a filter coefficient set occurs. Thereafter, the method establishes offset in one or more in-line delays and retraining the one or more in-line filters and the one or more cross-talk filters with offset to establish new coefficient set. These are stored and then the method establishes additional offsets. For each additional offset retraining occurs on the one or more in-line filters and the one or more cross-talk filters to create a filter coefficient set associated with each offset, which is stored with the additional filter coefficients sets associated with each offset. The method then analyzes the filter coefficient sets to determine the offset which maximized cancellation for each of the crosstalk paths. The method then identifies the maximum cancellation offset of these cancellation offsets calculated for each cancellation filter. The method thereafter establishes one or more in-line filters with a coefficient set which corresponds to maximum cancellation offset and also establishes one or more in-line delays with offset which corresponds to the maximum cancellation offset found in the last step. The method also establishes one or more cross-connect filters with coefficient set which corresponds to maximum cancellation offset, and establishes one or more cross-connect delays with offset which corresponds to maximum cancellation offset.

This method may further comprise analyzing the offset for the one or more cross-connect delays to determine a cross-connect delay with a maximum delay and establishing the one or more in-line delays to have the same amount of delay as the cross-connect delay with the maximum delay. Then the method resets the cross-connect delay which had the maximum delay amount to zero and also adjusts the remaining cross-connect delays to maintain the same amount of delay at the output by taking into account the newly established in-line delay. The method establishes one or more cross-connect filters with coefficient sets that correspond to the maximum cancellation offset for each cross-connect filter. The one or more in-line filters may comprise one or more in-line FFE type filters. It is contemplated that this method may be performed in a four channel communication system. It is contemplated that during training one or more coefficient set may be stored in memory.

Stated another way, the net delay between the victim and the interfering signal is equal to inline-delay minus cross-connect delay. This net delay value is calculated for each cross-connect filter, and then the maximum of these net delay values across the cross-connect filters is found. This maximum net delay is then used to set the inline delay. The cross connect delays are then set as described below.

During operation, the data from the repeated trainings with different offsets may be analyzed, and the optimum delay for each cross connect filter is determined by finding the delay associated with the contiguous group of coefficients, of the filter length, with the most energy. The maximum delay needed by any of the cross-connect filters determines the delay that can be used by the inline filter. Then given that inline delay, the crossconnect delays for each of the other filters can be calculated. Subsequently every delay is set to its calculated value, and then adaptation is enabled (there is no need to reload the coefficients since the filter will adapt to the optimum values). Other systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The components in the figures are not necessarily to scale, emphasis instead being placed upon illustrating the principles of the invention. In the figures, like reference numerals designate corresponding parts throughout the different views.

DETAILED DESCRIPTION

Figure 1:
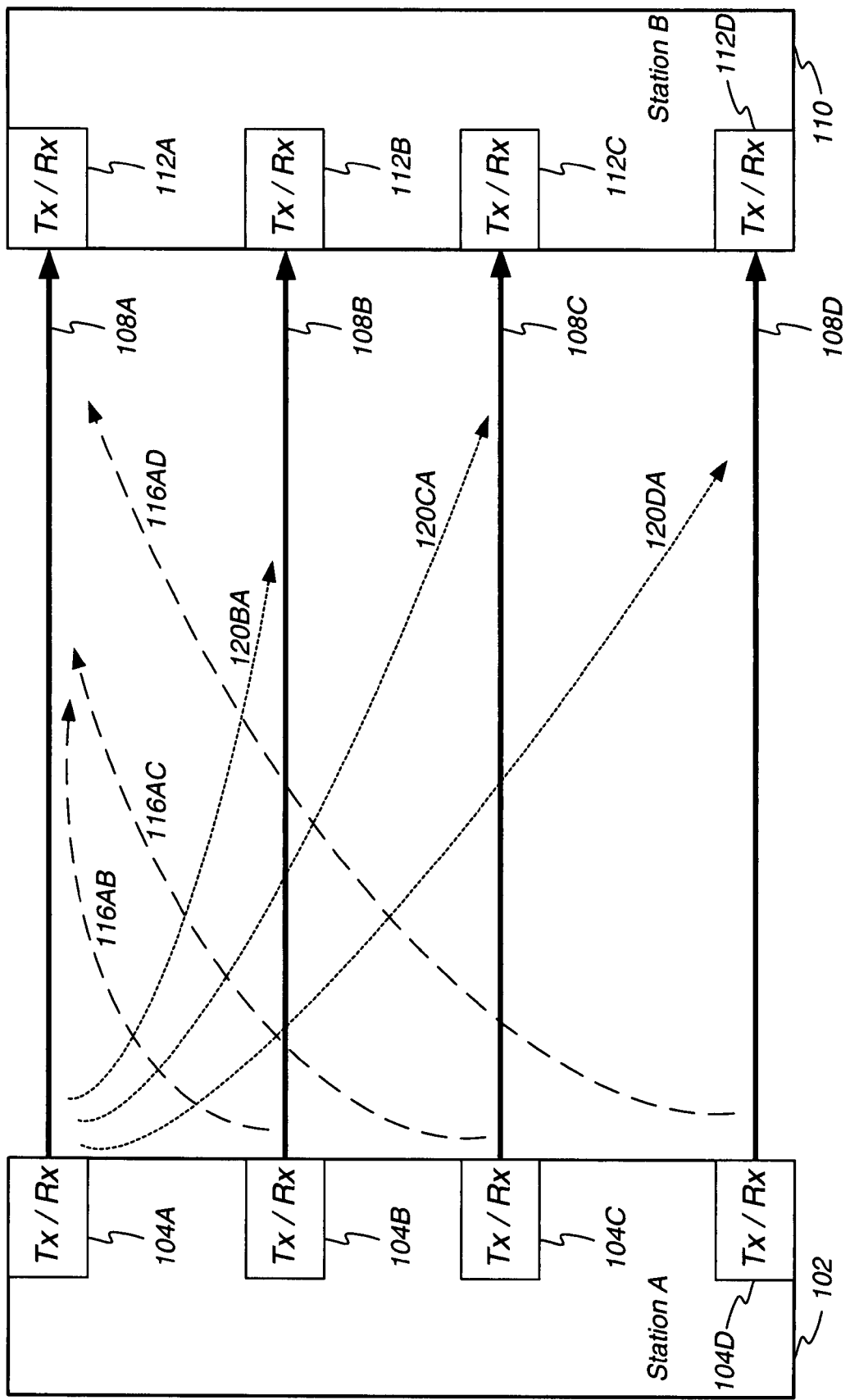
FIG. 1 illustrates a block diagram of a receiver/transmitter pair.
Figure 2:
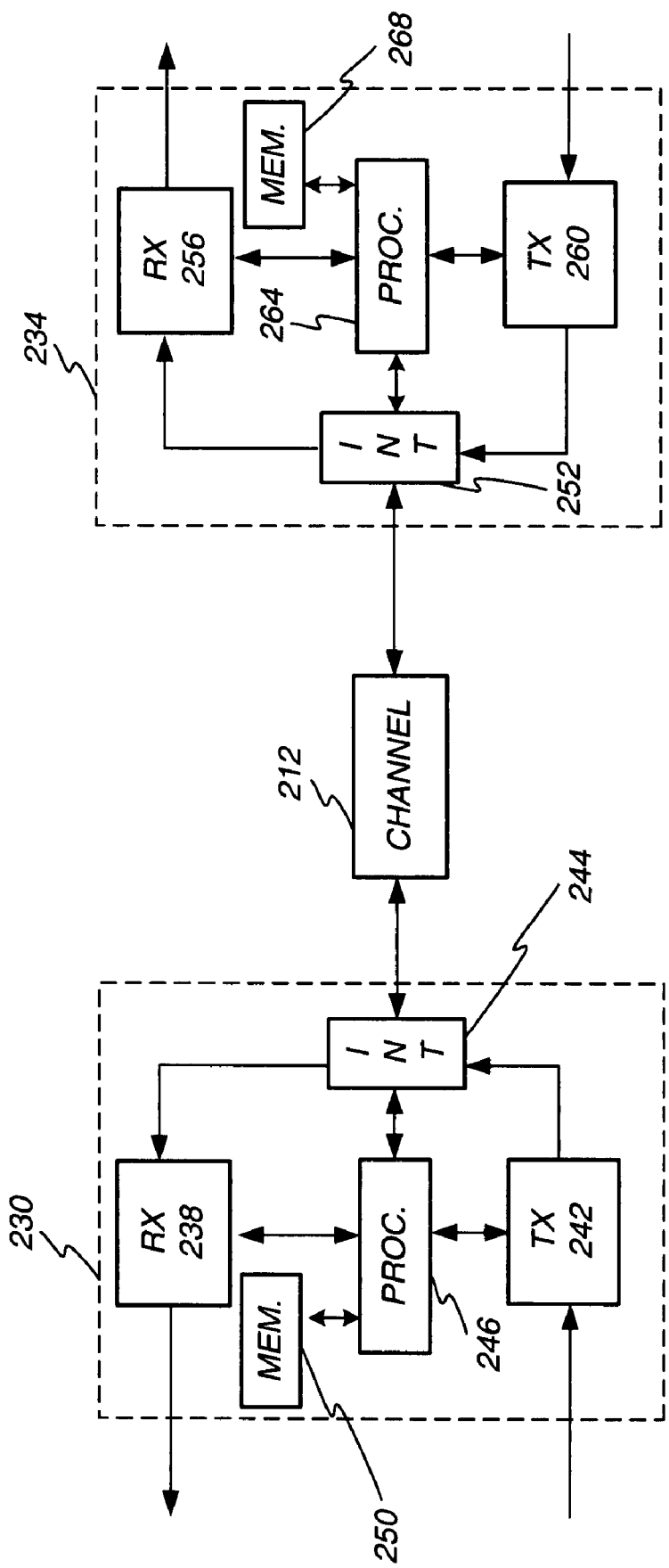
FIG. 2 illustrates a block diagram of an example embodiment of a two station communication system.

In reference to FIG. 2, a block diagram of a receiver/transmitter pair is shown. A channel 212 connects a first transceiver 230 to a second transceiver 234. The first transceiver 230 connects to the channel 212 via an interface 244. The interface 244 is configured to isolate the incoming and outgoing signals. The channel 212 may comprise more than one conductor, and hence the interface 244 may perform isolation for each channel based on direction of data flow. The receive module 238 and transmit module 242 may comprise any assembly of hardware, software, or both configured to operate in accordance with the principles described herein.

The receive module 238 and transmit module 242 communicate with a processor 246. The processor 246 may include or communicate with a memory 250. The processor operates as described below in more detail and as would be understood by one of ordinary skill in the art. The memory 250 may comprise one or more of the following types of memory: RAM, ROM, hard disk drive, flash memory, or EPROM. The processor 246 may be configured to perform one or more calculations or signal analysis. In one embodiment, the processor 246 is configured to execute machine readable code stored on the memory 250. The processor 246 may perform additional signal processing tasks as described below.

The second transceiver 234 is configured similarly to the first transceiver 230. The second transceiver 234 comprises an interface 252 connected to a receiver module 256 and a transmitter module 260. The receiver module 256 and a transmitter module 260 communicate with a processor 264, which in turn connects to a memory 268. Operation occurs as described below in more detail.

Figure 3:
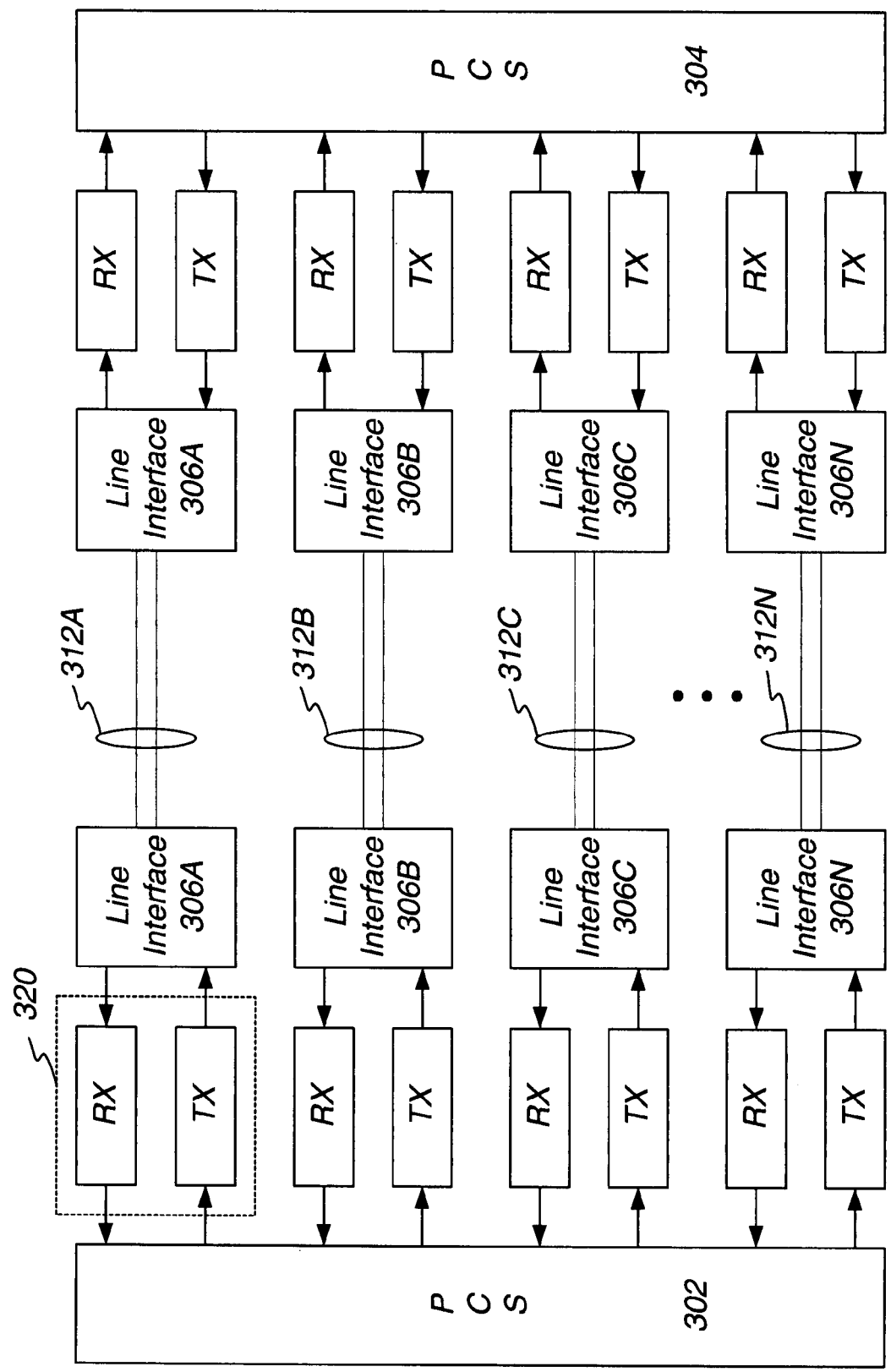
FIG. 3 illustrates a block diagram of an example embodiment of a multi-channel point-to-point communication system.

FIG. 3 illustrates a block diagram of an exemplary multi-channel point-to-point communication system. One exemplary application of such a multi-channel communication system is a multi-gigabit transceiver utilizing any category or class of shielded or unshielded twisted pair (UTP) cable supporting Ethernet protocols. As shown, it includes a physical coding sublayer (PCS) 302, 304 shown as coupled together over a channel 312A-312B. In one embodiment, each channel comprises twisted pair conductors. Each of the channels 312 is coupled between transceiver blocks 320 through a line interface 306, and each channel is configured to communicate information between transmitter/receiver circuits (transceivers) and the physical coding sublayer (PCS) blocks 302, 304. Although shown with four channels for purposes of discussion, any number of channels and associated circuitry may be provided. In one embodiment, the transceivers 320 are capable of full-duplex bi-directional operation. In one embodiment, the transceivers 320 operate at an effective rate of about 2.5 Gigabits per second.

Figure 4A:
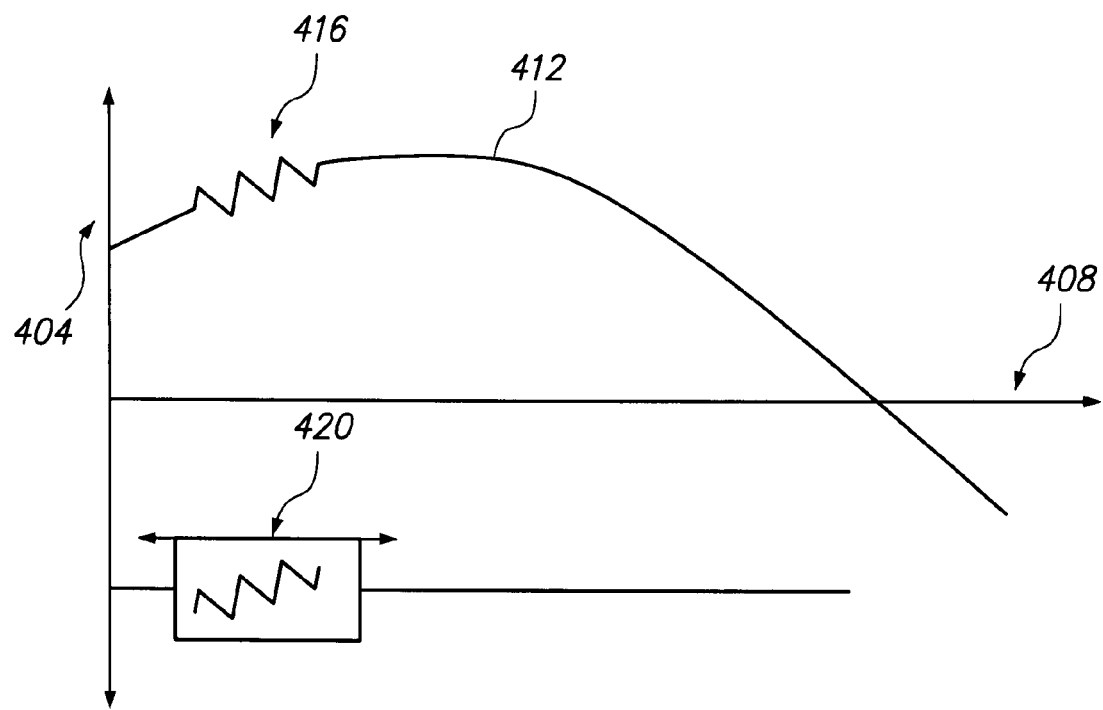
FIG. 4A illustrates a signal plot of a victim signal and associated cancellation signal.

FIG. 4A illustrates a signal plot of a victim channel with associated cancellation signal. This exemplary plot is provided for purposes of discussion and is not intended to represent an actual victim signal or cancellation signal. In this exemplary plot, the vertical axis 404 represents signal amplitude and the horizontal axis 408 represents time.

The victim signal plot 412 represents a victim signal as it is received at a receiver. In this example plot, the victim signal plot 412 has been affected in crosstalk interference signal 416 which disturbs the victim signal as shown.

To counter the effects of the crosstalk interference 416, a cancellation signal 420 is provided to be combined with the victim signal 412 and the crosstalk signal 416. It is contemplated that the cancellation signal 420 is generally opposite or identical to the interference signal, such that if combined with the victim signal, either through addition or subtraction, the cancellation signal would cancel the interference from victim signal.

As can be appreciated however, for the cancellation signal 420 to successfully cancel the interference signal, the cancellation signal must be properly time aligned with the victim signal. As a drawback to prior art method and systems, failure to properly time align the cancellation signal would result in less than optimal cancellation.

Figure 4B:
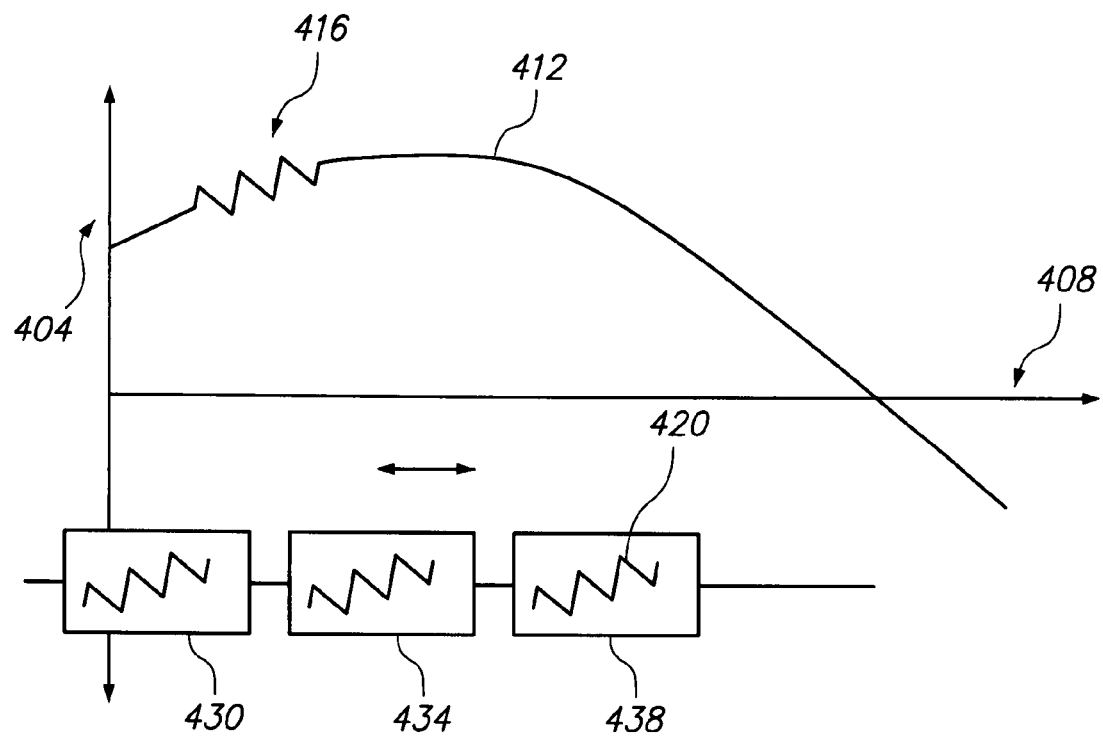
FIG. 4B illustrates a signal plot of a victim signal and crosstalk signal with various filter windows from corresponding delays.

FIG. 4B illustrates a signal plot of a victim channel with associated cancellation signal in different delay windows. This exemplary plot is provided for purposes of discussion and is not intended to represent an actual victim signal or cancellation signal. In this exemplary plot, the vertical axis 404 represents signal amplitude and the horizontal axis 408 represents time. As compared to FIG. 4A, identical reference numbers are used to identify identical elements.

As compared to FIG. 4A, FIG. 4B illustrates delay windows 430, 434, 438 as shown. These delays windows 430, 434, 438 represent time adjustable windows at which the cancellation signal may be established, to achieve ideal time alignment of the cancellation signal 420 with the interference contained in the victim channel. In this example embodiment, the delay window 438 has zero delay, while delay window 434 is set to L delay and delay window 430 is set to 2L delay. L is the length of the delay window. The amount of delay may be set to any value, dependent on the magnitude and resolution of the delay elements utilized to implement the delay.

By shifting the delay, the time alignment between the cancellation signal and the interference in the victim signal 412 may be optimized to maximize cancellation. In this example plot of FIG. 4B, an adjustable delay amount between windows 430 and 434 would best align the cancellation signal 420 with the interference 416 in the victim signal 412. The cancellation signal 420 may also be filtered as disclosed herein, to tailor its properties to best achieve cancellation.

Figure 5A:
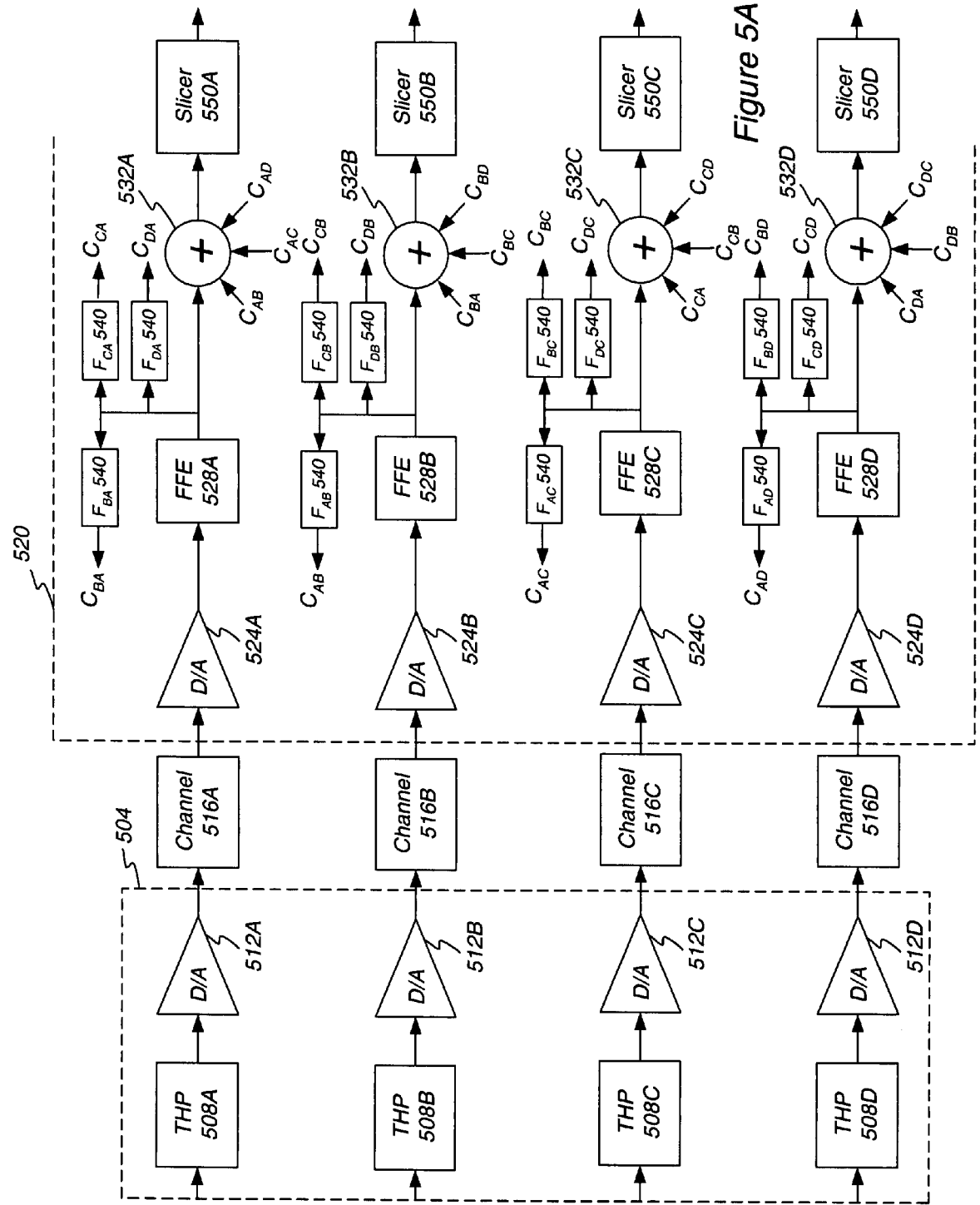
FIG. 5A illustrates a block diagram of an example embodiment of a crosstalk cancellation system with cross-connect filters.

FIG. 5A illustrates an exemplary block diagram of an example embodiment of a crosstalk cancellation system with cross-connect filters. This is a generalized block diagram and as such, it is simplified to show the environment of use and general functionality. One of ordinary skill in the art would understand that additional elements would be provided to enable operation. In this example embodiment, the system is enabled in a four channel environment. In one embodiment, each channel comprises a twisted pair conductor but in other embodiments, other types of channels may be utilized.

In this example embodiment, portions or a receiver 504 are shown as including a precoder 508 and a digital analog converter 512. In this embodiment, the precoding comprises Tomlinson-Harashima type preceding, but it is contemplated that any other type of precoding or pre-filtering may be utilized. It is also contemplated that pre-coding may be omitted in some embodiments. The output of the transmitter 504 connects to the channel and is configured to transmit a signal over the channel to the receiver 520. The channel 516 may comprise any type communication path or medium. It is contemplated that a driver or amplifier (not shown) or other processing apparatus may reside in the transmitter 504.

The receiver 520 comprises an analog front end, which may comprise a digital to analog converter 524 and other components. In this embodiment, each leg of the receiver 520 also comprises a feed forward filter (FFE) 528A-528D, which in turn has an output which feeds into a junction 532A-532D and one or more filters 540 ($F_{xy}$, where x signifies the destination channel and the y represents the origination channel). The FFE 528 may comprise any type filter or equalizer capable of performing as described herein. The FFE 528 may comprise a digital filter. In other embodiments, the FFE 528 may be replaced with analog filters.

The filters 540, which are in the cross-connect path, may be individually configured to maximize cancellation in the victim signal associated with the channel receiving the cancellation signal. Thus, the response of each filter 540 may be unique to the particular crosstalk coupling parameters between the victim and offender signal. The filters 540 may comprise any type filter or equalizer. In one embodiment, the filters 540 comprise transversal FIR filters adapted by use of the LMS algorithm.

The junctions 532A-532D may comprise a summing junction, a subtractor, or any other element configured to perform as described herein. The filters 540 are configured to modify the signal, which is eventually provided to a junction 532 to create a cancellation signal tailored to cancel unwanted interference which couples into the corresponding other channel. The filters 540 are referenced herein by reference number and filter identifier, such as $F_{BA}$, which indicates that the filter 540 processes or creates a cancellation signal from channel A for the victim signal on channel B. As can be seen, in this four channel system, having channels A, B, C, and D, the channel A output from the FFE 528A feeds into three filters 540, namely, filters $F_{BA}$, $F_{CA}$, and $F_{DA}$. Filter 540 $F_{BA}$ creates a cancellation signal $C_{BA}$, which is a cancellation signal from channel A to channel B. Filter $F_{CA}$ creates a cancellation signal $C_{CA}$. Filter $F_{DA}$ creates a cancellation signal $C_{DA}$.

This pattern repeats for each channel. In particular, for channel B, the output of the FFE 528B feeds into the filters 540 $F_{AB}$, $F_{CB}$, $F_{DB}$. Each of these filters 540 creates a cancellation signal. In particular, filter $F_{AB}$ creates a cancellation signal $C_{AB}$. Filter $F_{CB}$ creates a cancellation signal $C_{CB}$. Filter $F_{DB}$ creates a cancellation signal $C_{DB}$.

For Channel C, the output of the FFE 528C feeds into the filters 540 $F_{AC}$, $F_{BC}$, $F_{DC}$. Each of these filters 540 creates a cancellation signal. In particular, filter $F_{AC}$ creates a cancellation signal $C_{AC}$. Filter $F_{BC}$ creates a cancellation signal $C_{BC}$. Filter $F_{DC}$ creates a cancellation signal $C_{DC}$.

For Channel D, the output of the FFE 528D feeds into the filters 540 $F_{AD}$, $F_{BD}$, $F_{CD}$. Each of these filters 540 creates a cancellation signal. In particular, filter $F_{AD}$ creates a cancellation signal $C_{AD}$. Filter $F_{BD}$ creates a cancellation signal $C_{BD}$. Filter $F_{CD}$ creates a cancellation signal $C_{CD}$.

The output of each filter 540 is fed into a junction 532A-532D associated with one of the other channels as set forth in FIG. 5A. As way of example, the junction 532B receives a cancellation signal $C_{BA}$ from channel A, $C_{BC}$ from channel C, and $C_{BD}$ from channel D. The other junctions 532A, 532C, 532D also receive cancellation signals as shown in FIG. 5A.

The output from each junction 532 comprises the victim channel without the unwanted crosstalk interference, which has been removed by the cancellation signals C. The output from each junction 532 feeds into a slicer, namely slicer 550A, 550B, 550C, and 550D. The slicer is utilized to quantize the received and processed signal to one of multiple pre-determined values which then represent the received signal at the moment of slicer 550 operation. The slicer output may be utilized for subsequent error correction processing. In some embodiments, the slicer may be omitted.

In operation, the cross-connect filters 540 are trained to modify the output signal from the FFE 528 for each respective channel such that the output of the filter 540 will cancel crosstalk which couples into the other channels, often referred to as the victim channels. By tailoring the response of each filter 540 associated with each channel, the cancellation signals C can be created and routed to the appropriate junctions 532 for cancellation of unwanted crosstalk interference.

Figure 5B:
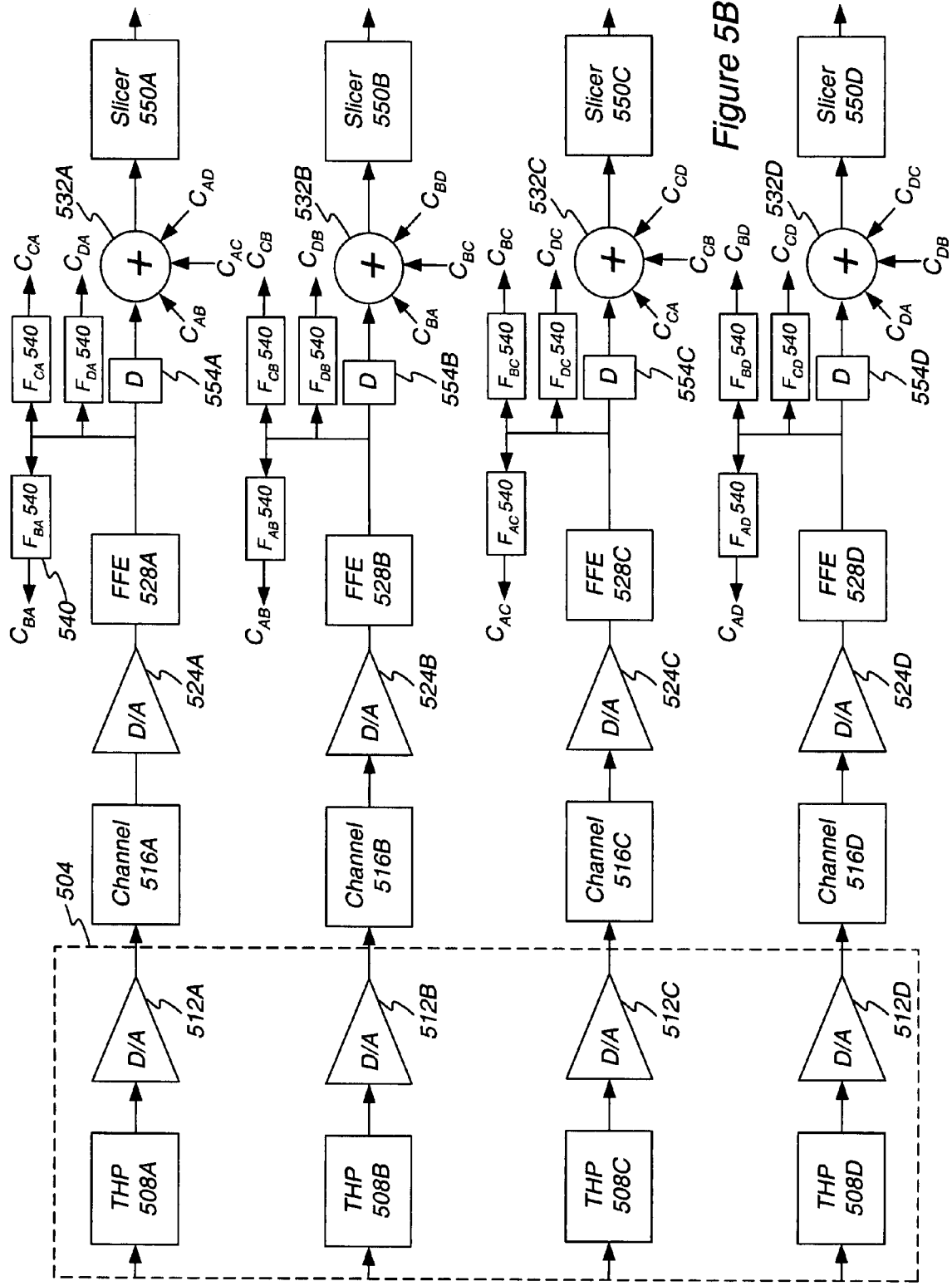
FIG. 5B illustrates a block diagram of an example embodiment of a crosstalk cancellation system with cross-connect filters and a sliding delay.

FIG. 5B illustrates a crosstalk cancellation system with incorporated delays. As compared to FIG. 5A, identical or similar elements are labeled with identical referenced numbers. As compared to FIG. 5A, the embodiment of FIG. 5B includes a fixed or adjustable delay 554A-554D as shown. These delays 554 are located in the primary signal path and thereby delay the signal provided to the junction 532. The delays 554 may be referred to as inline delays. It is contemplated that the amount of delay may be fixed, or in a preferred embodiment, variable to account for different propagation speeds of the signal through the channel for each signal (can be due to the pairs being different lengths) or other delay introduced when processing in the signal.

In operation, the amount of delay introduced by each delay 554A-554D is selected to maximize the crosstalk cancellation resulting from each cancellation signal. By delaying the signals on one or more channels A-D as shown, the time alignment between the cancellation signal and the victim signal may be optimized. One exemplary method of training and delay adjustment is described below in connection with FIG. 7. All or a portion of this method may be applied to the embodiment of FIG. 5B.

Figure 5C:
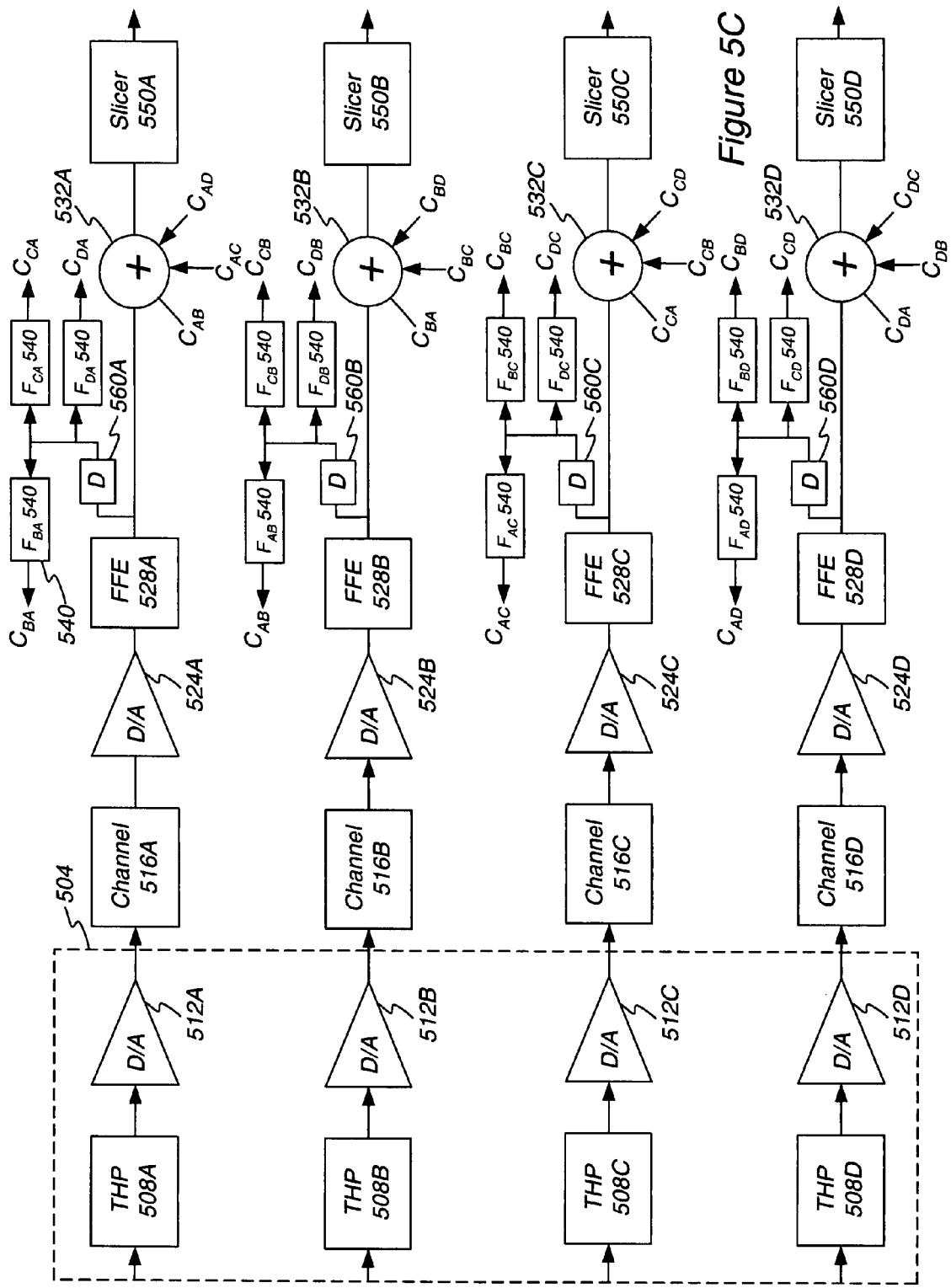
FIG. 5C illustrates a block diagram of an example embodiment of a crosstalk cancellation system with cross-connect filters and a sliding delay in the cross-connect path.

FIG. 5C illustrates an example embodiment of a crosstalk cancellation system with a variable delay in the cross-connect path. As compared to FIG. 5B, identical or similar elements are labeled with identical reference numbers. In FIG. 5C, a delay element 560 is located prior to the filters 540. In particular, a delay element 560A-560D is associated with and located in a path between the output of the FFE 528 and the filters F 540. In this embodiment the delay 560 does not delay the signal on each channel traveling between the FFE 528 and the junction 532.

In this configuration, the delay 560 only affects the signal going to the filters F 540 but not the victim signal itself. This provides the benefit of more accurate control over the cancellation signals. It is also contemplated that the configuration of FIGS. 5C and 5B may be combined to provide a delay 554 in the primary path and a delay 560 the cross connect path. This may further increase resolution of the delay provided to each channel and to the cancellation signals generated by the filters 540.

In operation, the delay 560 may be set to optimize the delay established in the each signal sent to each bank of cross connect filters 540 for a particular channel. In one embodiment, optimizing the delay comprises setting the amount of delay, if any, to maximize crosstalk cancellation. Upon receipt of a signal from the FFE 528, each delay 560 may delay (time adjust) the incoming signal by an amount appropriate to generate cancellation signals which are ideally time aligned with the victim signal. Using a single delay 560 for each channel has the benefit of optimizing the amount of delay for a group of filters associated with a particular channel without affecting or delaying the victim signal on that particular channel. This design also minimizes the number of utilized delays.

Figure 5D:
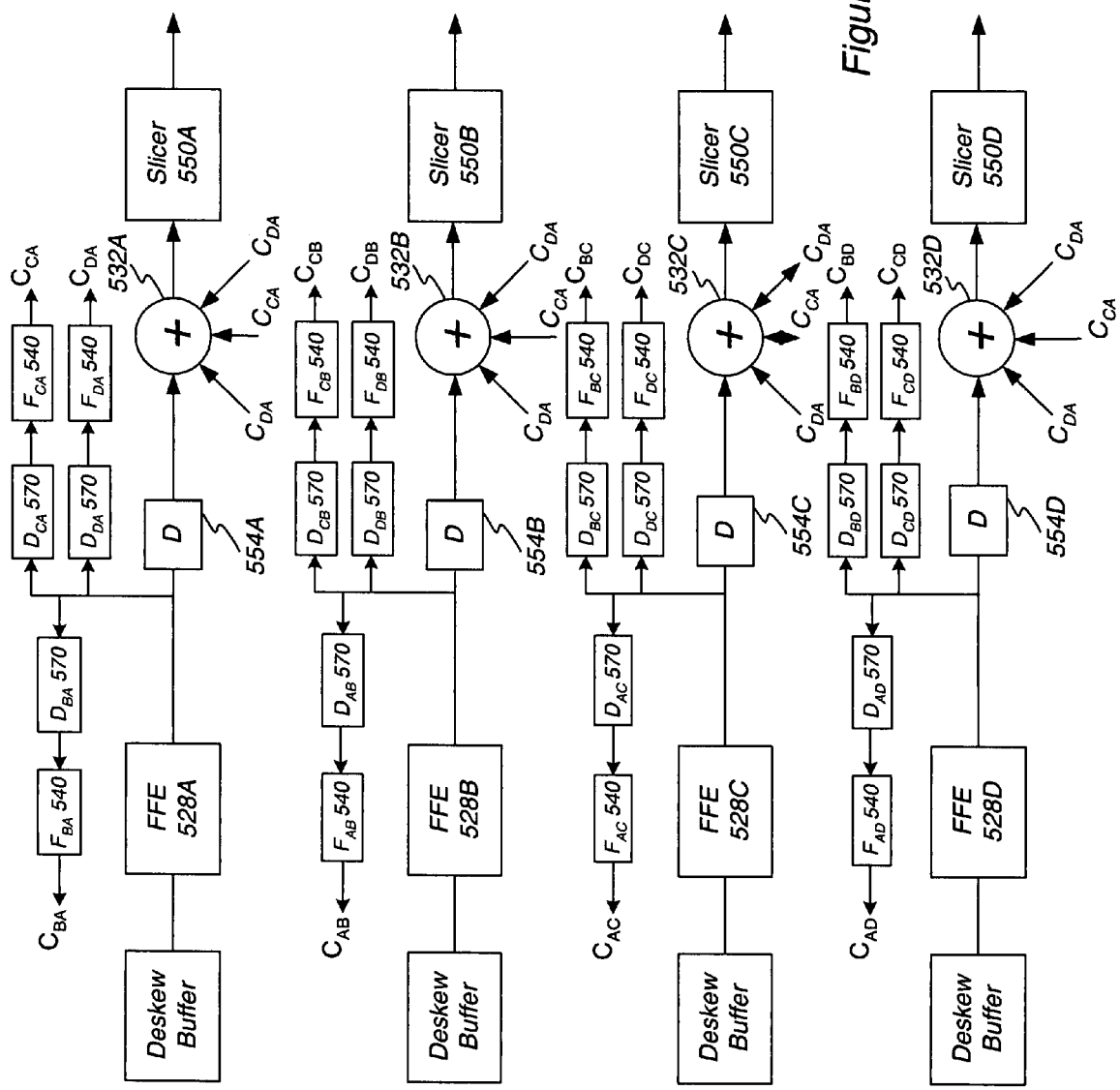
FIG. 5D illustrates a block diagram of an example embodiment of a crosstalk cancellation system with cross-connect filters and a sliding delay in each cross-connect path.

FIG. 5D illustrates an example embodiment of a crosstalk cancellation system with variable delays. As compared to FIGS. 5A-5C, identical or similar elements are labeled with identical reference numbers. In this embodiment, a delay 570 is inserted into each cross-connect path as shown. The delay 554 is again between the FFE 528 and the slicer 550, located after the input to the FEXT cancellation filters.

The FFE 528 output is provided to the cross-connect path, such as to delay 570. The delays 570 and 540 may comprise variable delays. The delays 570 are referenced herein by reference number and delay identifier, such as $D_{BA}$, which indicates that the delay 570 processes or creates a cancellation signal from channel A for channel B.

As can be seen, in this four channel system, having channels A, B, C, and D, the channel A output from FFE 528A feeds into three cross-connect delays 570, namely, delay $D_{BA}$, $D_{CA}$, and $D_{DA}$. Delay $D_{BA}$ creates a cancellation signal $C_{BA}$. Delay $D_{CA}$ creates a cancellation signal $C_{CA}$. Delay $D_{DA}$ creates a cancellation signal $C_{DA}$.

This pattern repeats for each channel. In particular, for channel B, the output of FFE 528B feeds into the cross-connect delays 570 $D_{AB}$, $D_{CB}$, $D_{DB}$. Each of these delays 570 creates a cancellation signal. In particular, delay $D_{AB}$ creates a cancellation signal $C_{AB}$. Delay $D_{CB}$ creates a cancellation signal $C_{CB}$. Delay $D_{DB}$ creates a cancellation signal $C_{DB}$.

For Channel C, the output of the FFE 528C feeds into the cross-connect delays 570 $D_{AC}$, $D_{BC}$, $D_{DC}$. Each of these delays 570 creates a cancellation signal. In particular, delay $D_{AC}$ creates a cancellation signal $C_{AC}$. Delay $D_{BC}$ creates a cancellation signal $C_{BC}$. Delay $D_{DC}$ creates a cancellation signal $C_{DC}$.

For Channel D, the output of FFE 528D feeds into the cross-connect delays 570 $D_{AD}$, $D_{BD}$, $D_{CD}$. Each of these delays 570 creates a cancellation signal. In particular, delay $D_{AD}$ creates a cancellation signal $C_{AD}$. Delay $D_{BD}$ creates a cancellation signal $C_{BD}$. Delay $D_{CD}$ creates a cancellation signal $C_{CD}$.

The output of each delay 570 is fed into an appropriate junction 532A-532D associated with one of the other channels as set forth and discussed above. The junction follows the delay 554A-D. As way of example the input to junction 532B receives a cancellation signal $C_{BA}$ from channel A, $C_{BC}$ from channel C, and $C_{BD}$ from channel D. The other junctions 532 also receive cancellation signals as shown in FIG. 5.

The output from each junction 532 comprises the victim channel signal without the unwanted crosstalk interference. As a benefit to the embodiment of FIG. 5D, each cross-connect path includes a delay 570 and a filter 540 to thereby tailor the input to an optimized cancellation signal. The amount of time adjustment introduced into each cross-connect path signal may be tailored to optimize time alignment between the cancellation signal the victim signal. In addition, the filter 540 in the cross-connect path also tailors the cancellation signal achieve maximum cancellation when combined with the victim signal.

FIG. 6 illustrates an example method of training the embodiment of FIG. 5D. One or more of the steps for training may be implemented for the embodiments shown in FIG. 5A-5C or additional steps, not shown in FIG. 6 may be implemented. In addition, this is but one possible method of training and as such, it is contemplated that one of ordinary skill in the art may, after reading this disclosure, enable other methods of operation and training.

Figure 6A:
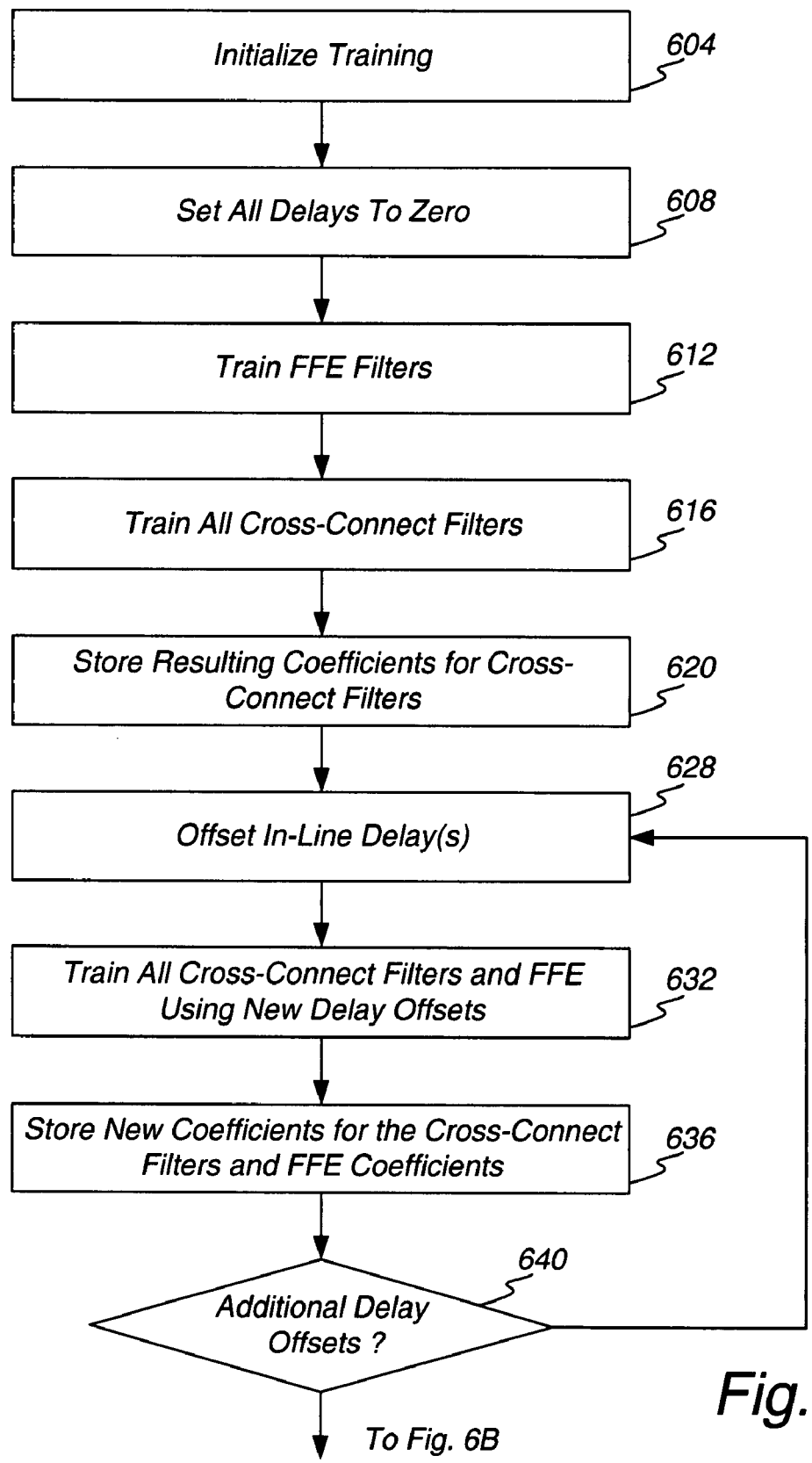
FIG. 6 illustrates an operational flow diagram of an example method of training.

Referring now to FIG. 6A, at a step 604, the training process is initialized. It is contemplated that the training process occurs prior to operation, but could also occur during operation. Next, at a step 608, all of the delays are set to zero and the cross-connect filters are set to some reset value e.g. all zeroes, although other values could be utilized.

At a step 612 the operation trains the FFE filters (and DFE filters if enabled) to maximize SNR through ISI equalization and noise whitening. This establishes the FFE filter coefficients. Thereafter, at step 616 the training operation trains the cross-connect filters to maximize cross-talk cancellation. Training of the cross-connect filters occurs with the cross-connect delays 570 set to zero and the FFE coefficients set to the values established at step 612. The line delays 554 are initially set to their maximum value. The cross-connect filters are trained to maximize cancellation of unwanted crosstalk.

With regard to the training of the FFE filter and the cross-connect filters, any training method may be utilized. One such example method of training comprises least mean square (LMS) type training. It is also contemplated that any other training routine or algorithm may be implemented to train the filters to establish filter coefficients.

At a step 620, the system stores the resulting coefficients for the cross-connect filters resulting from the prior training.

At a step 628 an offset is established in the in-line delay. As defined herein, the in-line delay is the delay 554 located between the FFE and the junction. Any amount of delay or time offset may be established by the in-line delay. In one embodiment, an amount of delay offset equal to the FEXT cancellation filter length is established. In other embodiment, a fraction of this amount is established. Then after a delay is established, the operation re-trains one or more of the cross-connect filters and the FFE filter with this time offset in place. This occurs at a step 632. In one embodiment, all of the cross-connect filers are re-trained. This training thus occurs with the delay set to an offset amount.

Then, at a step 636, the system stores the new coefficients for the cross-connect filters and the FFE filters. These values, as with other values described herein may be stored in memory. These new coefficient values for the filters are established when the delay offset amount as set in step 628.

Next, at a decision step 640, a determination is made whether additional delay offsets are available. It is contemplated that a delay window is established and within the delay window multiple delay offsets may be established to progress the delay offset amount through this window until stored coefficients cover the full cancellation window. If at decision step there are additional offsets available, then the operation returns to step 628 wherein an additional offset is established. Accordingly the operation progresses through steps 628, 632 and 636 as discussed above until training occurs at all of the possible delay offsets. For each delay offset, the corresponding generated coefficients are stored in memory and associated with the offset amount in use when such coefficients were established.

Figure 6B:
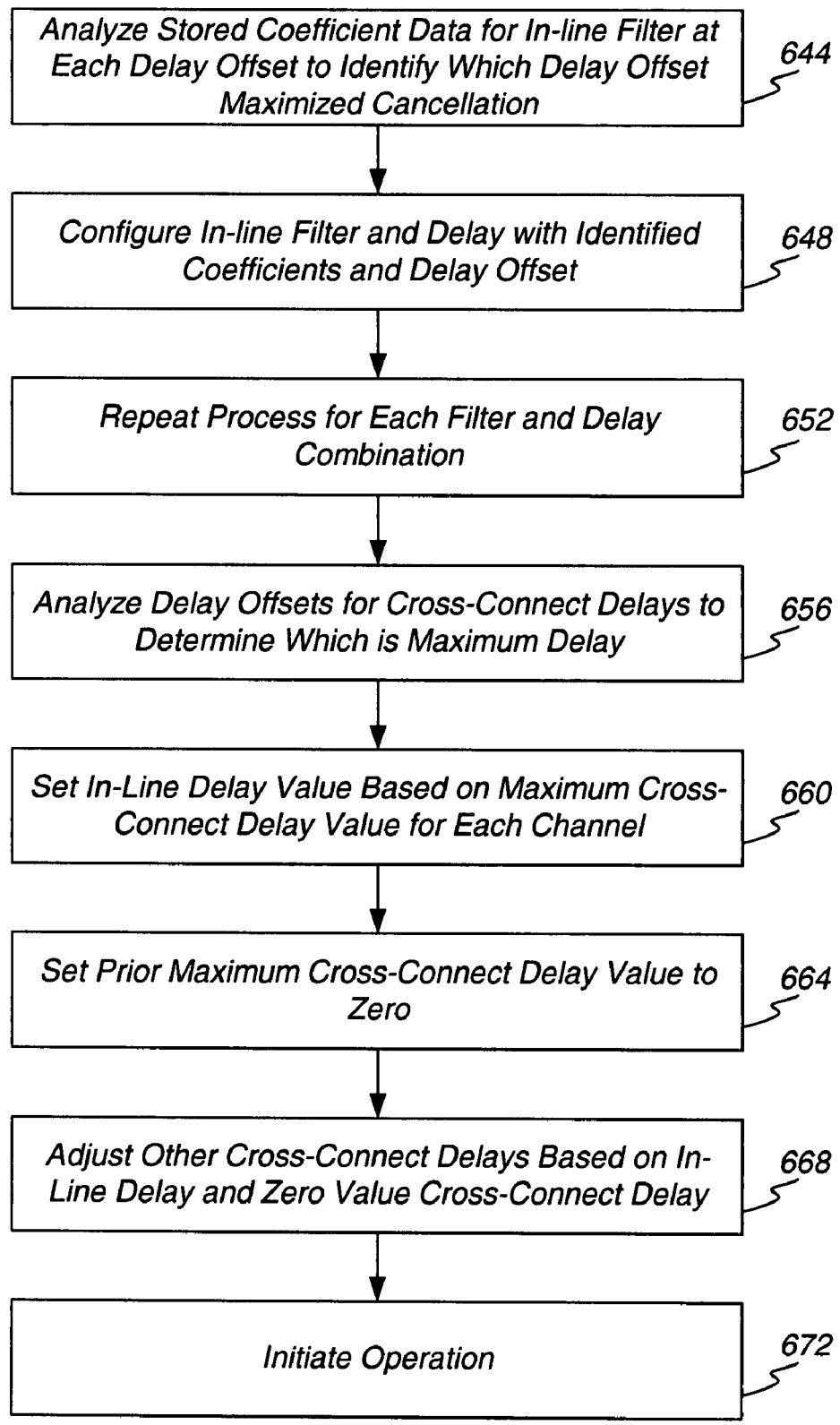

Alternatively, if at step 640 a determination is made that there are no additional offsets, then the operation advances to step 644, which is shown on FIG. 6B. At step 644, the operation analyzes the stored coefficients and associated offset amount (time delay) to determine the data set which maximizes cancellation. As defined herein, each associated pair of coefficient values and offset amount is referred to as a data set. The data set which maximizes cancellation is defined as that which achieves the maximum slicer SNR or it is determined by the amount of cancellation or energy contained in the coefficients of the FEXT filters.

At a step 648, the operation configures the in-line filter and delay with the data set, i.e. coefficient values and offset amount, as identified in step 644, which maximizes cancellation. Then, at step 652, the process is repeated for each filter and delay combination on each of the channels.

At a step 656, the training process then analyzes the delay offsets for the cross-connect delays to determine, for each channel, which delay requires the maximum delay offset between victim and disturber pairs. For example, based on the prior steps, each of the delays will likely be set to an offset value which maximizes cancellation for that cross-connect path. In this example embodiment associated with FIG. 5D there are four channels, and each channel has three cross-connect paths, which connect to the other three channels. Of the three cross-connect paths, each of which has a delay, the operation determines the delay with the maximum offset and identifies the amount of this delay. This is referred to as the maximum cross-connect delay amount.

At step 660, the operation sets the in-line delay value to the delay amount identified in step 656, which is the maximum cross-connect delay amount, associated with that channel. This occurs for each channel such that the in-line delay is set to an amount equal to the maximum delay identified in a cross-connect delay associated with that channel. At a step 664, the cross-connect delay which was previously identified as having the maximum delay for the group of cross-connect filters associated with a channel is set to zero. This can be understood to occur because the in-line delay is been set to this maximum offset amount, so to maintain the same delay in the cross-connect line, the previously maximum offset cross-connect delay is set to zero.

Thereafter, at a step 668, the operation adjust the other cross-connect delays based on the new in-line delay amount and the cross-connect delay which was set to zero offset at step 664. The adjustment of step 668 occurs to account for the delay established in the in-line delay, such that after establishing the in-line delay offset, the other cross-connect delays are set to an offset amount which results in an identical amount of delay from their resulting outputs as established in step 656.

By way of example, in reference to FIG. 5D if the maximum cross-connect delay was −5 for cross-connect delay $D_{BA}$, and the other two cross-connect delays were −3 (delay $D_{CA}$) and −1 (delay $D_{DA}$), then the in-line delay is set to −5 and delay $D_{BA}$ would be set to zero. To establish delay $D_{BA}$ at zero, 5 time offsets were added. Accordingly 5 offsets would also be added to delay $D_{CA}$ and delay $D_{DA}$, establishing the delay offsets at 2 and 4 respectively.

At this stage, all of the delays are established and the filter coefficients are also established. At step 672, training is complete and operation of this aspect of the communication system may commence.

It should be further noted that a decision feedback equalizer (DFE) may be part of the embodiment shown in FIG. 5 and the DFE's may be trained to create Tomlinson-Harashima precoder coefficients. In particular, in one embodiment the FEXT cancellers are trained both when the DFE is active, and after its coefficients have been moved to the Tomlinson-Harashima precoder and the DFE is disabled. In the DFE-enabled mode this adds another filter to the system diagram, feeding back from the slicer output, with the output subtracting from the slicer input. In the 10GBase-T system the FEXT is first trained with the DFE enabled. Then the DFE coefficients are transferred to the precoder on the other side of the link and the DFE is disabled. Then the FFE and FEXT filters are retrained as discussed herein.

Figure 7:
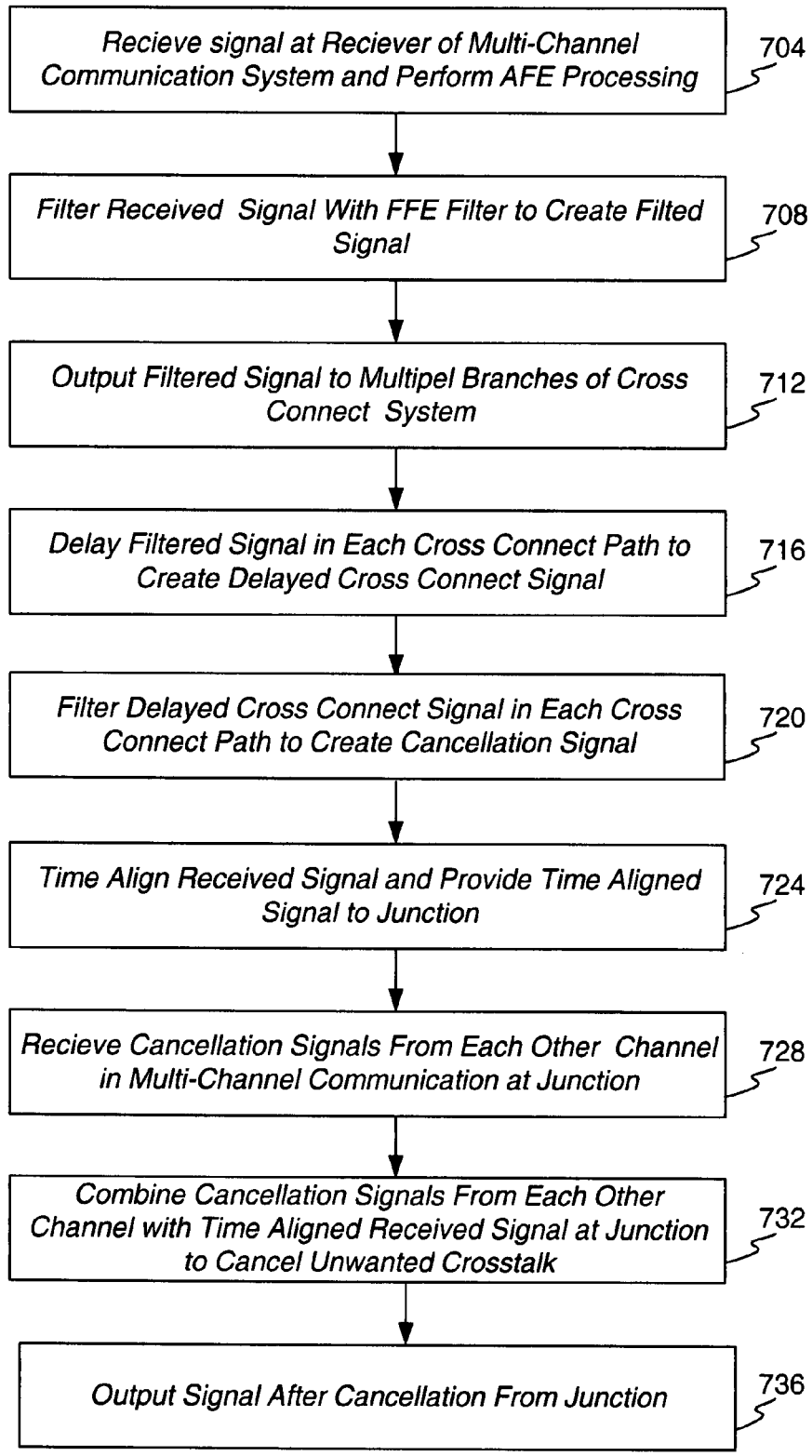
FIG. 7 illustrates an operational flow diagram of an example method of operation.

FIG. 7 illustrates an operational flow diagram of an example method of operational of the system of FIG. 5D. This is but one possible method of operation and it is contemplated that in other embodiments other methods of operation may be enabled. At a step 704 the multi-channel communication system receives a signal or the multiple signals and performs analog front end (AFE) type processing. AFE type processing is known in the art and as such is not discussed in details herein. After reception, the operation advances to step 708 wherein the system filters the received signal(s) with an FFE type filter to create a filtered signal.

At step 712, the operation outputs the filtered signal to the multiple paths of the cross connect system. At a step 716, the cross connect system delays the filtered signal in each cross-connect path to create delayed cross connect signals. At a step 720, the cross connect system filters the delayed cross connect signal in each cross connect path to create cancellation signals. It is contemplated that the operation of filtering and delaying in steps 716 and 720 can be reversed such that filtering occurs before the delay operation. At a step 724, the operation time aligns the receive signal and provides this time aligned signal to a junction. The processes of time aligning may be performed by a delay, such as a variable delay. The delay operation of step 716 may also be considered as time aligning signals.

At a step 728 the junction receives the cancellation signals from each of the other channels in the multi-channel communication system and, at a step 732, combines this cancellation signal with time aligned received signals at the junction. The combination, which may comprise addition, subtraction, or both, cancels the unwanted crosstalk from the received signal. At step 736 the signal is output from the junction.

While various embodiments of the invention have been described, it will be apparent to those of ordinary skill in the art that many more embodiments and implementations are possible that are within the scope of this invention. In addition, the various features, elements, and embodiments described herein may be claimed or combined in any combination or arrangement.

What is claimed is:

1. A method for training a crosstalk cancellation system, for each channel the method comprising:
    providing a crosstalk cancellation system comprising one or more in-line filters, one or more in-line delays, one or more cross-connect filters, one or more cross-connect delays and a memory;
    setting one or more in-line delays and one or more cross-connect delays to zero delay;
    training the one or more in-line filters;
    training the one or more cross-connect filters to generate cross-connect filter coefficients;
    store the cross-connect filter coefficients;
    continue to adapt the one or more in-line filters and store resulting in-line filter coefficients with the cross-connect filter coefficient as filter coefficient sets;
    establishing an offset in one or more in-line delays;
    retraining the one or more in-line filters and the one or more cross-talk filters with the established offset to establish new coefficient set;
    storing the new coefficient set;

establishing additional offsets and for each additional offset:
retraining the one or more in-line filters and the one or more cross-talk filters to create a filter coefficient set associated with each offset;
storing the additional filter coefficients sets associated with each offset;
analyze the filter coefficient sets to determine which offset maximizes cancellation to thereby identify a maximum cancellation offset;
establish one or more in-line filters with coefficient set which corresponds to maximum cancellation offset;
establish one or more in-line delays with offset which corresponds to maximum cancellation offset for victim-interferer pair that needs the largest delay to maximize its cancellation;
establish one or more cross-connect filters with a coefficient set which corresponds to maximum cancellation offset;
establish one or more cross-connect delays with offset which corresponds to maximum cancellation offset.

2. The method of claim 1, further comprising:
analyzing the offset for the one or more cross-connect delays to determine a cross-connect delay that represents the relative delay needed between victim and interferer pair to maximize cancellation;
establishing the one or more in-line delays to have a delay amount which maximizes cancellation;
adjust cross-connect delays to maintain same amount of delay at output by taking into account newly establish in-line delay amount.

3. The method of claim 1, wherein the one or more in-line filters comprises one or more in-line feed forward equalizer type filters.

4. The method of claim 1, wherein the method is performed in a four channel communication system.

5. The method of claim 1, wherein during training one or more coefficient set is stored in memory.

* * * * *